United States Patent [19]

Kässer

[11] Patent Number: 5,222,252

[45] Date of Patent: Jun. 22, 1993

[54] STEREO RADIO RECEIVER MULTIPATH DISTURBANCE DETECTION CIRCUIT

[75] Inventor: Jürgen Kässer, Diekholzen, Fed. Rep. of Germany

[73] Assignee: Robert Bosch GmbH, Stuttgart, Fed. Rep. of Germany

[21] Appl. No.: 744,296

[22] Filed: Aug. 13, 1991

[30] Foreign Application Priority Data

Aug. 30, 1990 [DE] Fed. Rep. of Germany ....... 4027399

[51] Int. Cl.$^5$ ............................................. H04B 17/00
[52] U.S. Cl. .............................. 455/67.3; 455/226.1; 455/296; 455/297
[58] Field of Search ............... 455/295, 296, 297, 303, 455/304, 306, 67.3, 226.1, 226.3, 114; 381/13, 86

[56] References Cited

U.S. PATENT DOCUMENTS

| | | | |
|---|---|---|---|
| 4,225,751 | 9/1980 | Hershberger | 381/16 |
| 4,323,731 | 4/1982 | Hershberger | 455/114 |
| 4,454,607 | 6/1984 | Ogita | 455/226.3 |
| 4,524,446 | 6/1985 | Sun et al. | 455/226.3 |
| 4,538,285 | 8/1985 | Gielis et al. | 375/104 |
| 4,606,048 | 8/1986 | Sasaki et al. | 381/4 |

FOREIGN PATENT DOCUMENTS

| | | |
|---|---|---|
| 0069214 | 1/1983 | Fed. Rep. of Germany . |
| 0075647 | 4/1983 | Fed. Rep. of Germany . |
| 0140036 | 8/1982 | Japan ..................... 381/13 |
| 0129851 | 8/1983 | Japan ..................... 381/13 |

Primary Examiner—Reinhard J. Eisenzopf
Assistant Examiner—Timothy H. Keough
Attorney, Agent, or Firm—Frishauf, Holtz, Goodman & Woodward

[57] ABSTRACT

An improved FM car radio includes a recognition circuit for detecting intermittent multipath reception from the audio frequency signal, rather than from the intermediate frequency signal, as in prior art detectors. The output signal of the stereo decoder 6 is fed to a recognition circuit containing a 90° phase shifter 14, a multiplier circuit 15, a low-pass filter 16, a rectifier 17, and another low-pass filter 18. The resulting output signal $U_q$ is a measure of the quality of the signal, and can be used to initiate re-tuning to an alternate transmitter. For faster response, the recognition circuit can include a second signal path and a quotient former stage 23, resulting in an output signal $U_q^*$. Either $U_q$ or $U_q^*$ is fed back to a threshold value stage 19 for evaluation.

5 Claims, 3 Drawing Sheets

STEREO RADIO RECEIVER MULTIPATH DISTURBANCE DETECTION CIRCUIT

CROSS-REFERENCE TO RELATED APPLICATIONS, THE DISCLOSURES OF WHICH ARE HEREBY INCORPORATED BY REFERENCE

U.S. Ser. No. 07/671,261 of Mar. 18, 1991, Attig/-Kässer/Liman/Scholz,
U.S Ser. No. 07/676,895 of Mar. 28, 1991, Altmann-/Eilers,
U.S. Ser. No. 07/678,654 of Mar. 28, 1991, Attig/-Kässer/Duckeck/Eilers,
U.S. Ser. No. 07/735,089 of Jul. 24, 1991, Kässer,
Cross-reference to related patent publications, assigned to the assignee of the present invention:
German Patent DE-PS 31 26 224, WIEDEMANN, issued Jan. 19, 1989, and corresponding European patent 69 214 of Feb. 27, 1991;
German Patent DE-PS 31 38 395, SEIBOLD, issued May 23, 1990, and corresponding European patent 75 647 of May 2, 1985.

FIELD OF THE INVENTION

The present invention relates generally to stereo radio receivers and, more particularly, to a novel FM car radio with a stereo decoder and an interference detector.

BACKGROUND

The reception of an FM station by a car radio known to be subject to impairment by intermittent multipath reception of the station during a trip. Multipath reception can be demonstrated, according to German Patent Disclosure Document 31 26 224 A1, WIEDEMANN & SCHINDLER, filed Jul. 3, 1981 and published Jan. 20, 1983, by the removal of an interference signal located inside the IF bandwidth but above the stereo multiplex signal.

THE INVENTION

In the known car radio, the finding of interference was done on the basis of a peculiarity of the intermediate frequency signal. By contrast, it is an object of the present invention to seek a way to recognize interference from the low or audio frequency signal to be reproduced via the loudspeaker.

Briefly, a signal component in phase quadrature with respect to the differential signal is ascertained and evaluated to indicate interference. Other features of the co re concept of the invention are outlined hereinafter.

Two exemplary embodiments of the invention are shown in the drawing and described in detail below.

DRAWINGS

FIG. 1 is a block circuit diagram of a car radio;
FIG. 2 illustrates a first exemplary embodiment; and
FIG. 3 illustrates a second exemplary embodiment of the recognition circuit according to the invention, in each case in a more-detailed block circuit diagram.

DETAILED DESCRIPTION

Figure 1:
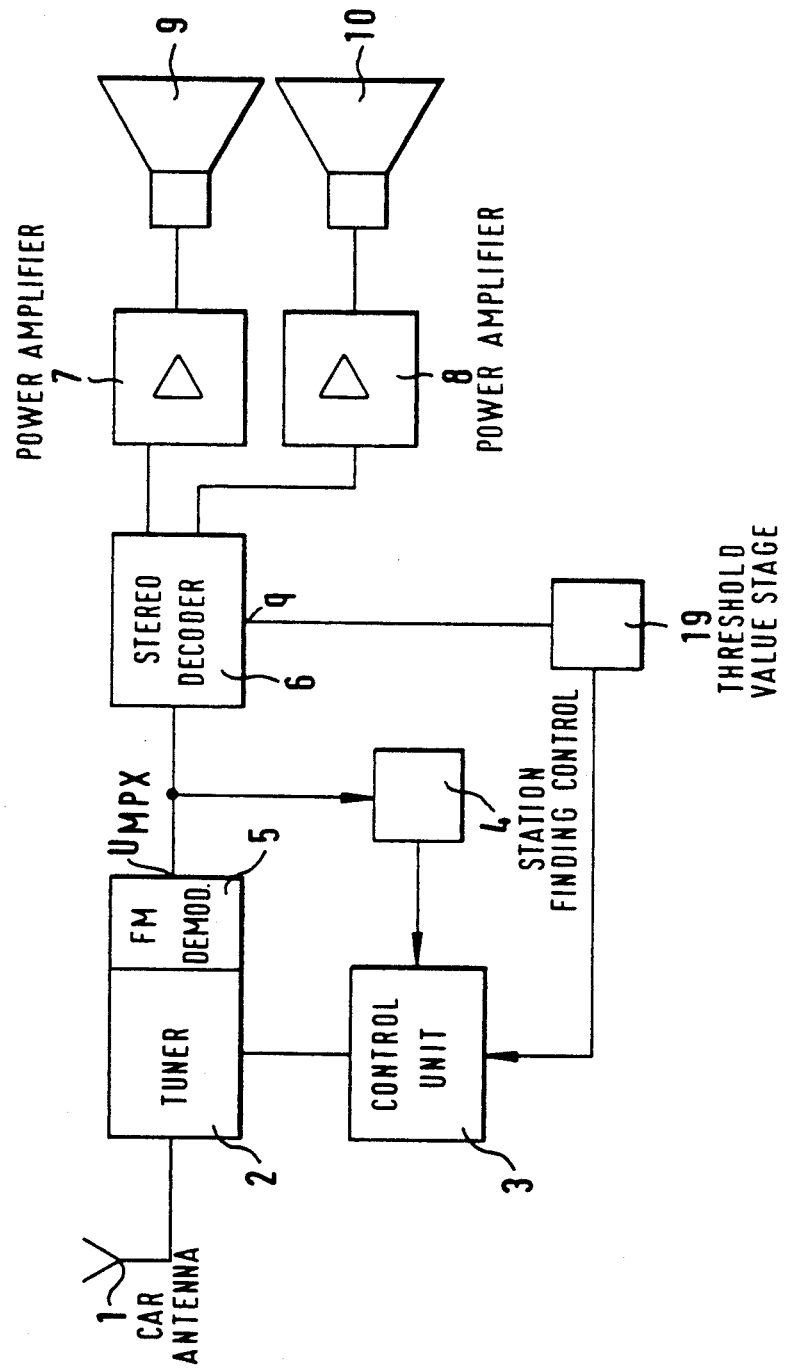

A carrier frequency of the radio program set with the tuner 2 is received via the car antenna 1. Tuning of the tuner 2 can be varied with a control unit 3 that includes a station finding control 4 for selecting alternative carrier frequencies. This control is not described in further detail here, because various ways to embody it are known.

The tuner 2 includes an FM demodulator 5, at the output of which the low-frequency multiplex signal $U_{MPX}$, that is, the modulation of the receiver carrier frequency, can be picked up and is made audible via the stereo decoder 6 and power amplifiers 7 and 8 connected to its output side via the loudspeakers 9 and 10.

The summation signal $U_{L+R}$ summing the left and right stereo channel signals) is already contained in this signal $U_{MPX}$. Additionally, the differential signal $U_{L-R}$ (left channel signal minus right channel signal) for stereophonic reproduction of the program selected is recovered in the input circuit of the stereo decoder 6. To this end, a PLL (Phase Locked Loop) stage 11, tuned to the 19-kHz pilot tone, and a frequency doubler circuit 12 that furnishes a 38-kHz auxiliary carrier, which is multiplied by the signal $U_{MPX}$ in a multiplier 13, are used in a known manner. The differential signal $U_{L-R}$ can be picked up at the output of the multiplier. The recognition circuit 25 or 25' according to the invention is connected to the stereo decoder, and its output is connected to the control unit.

Figure 2:
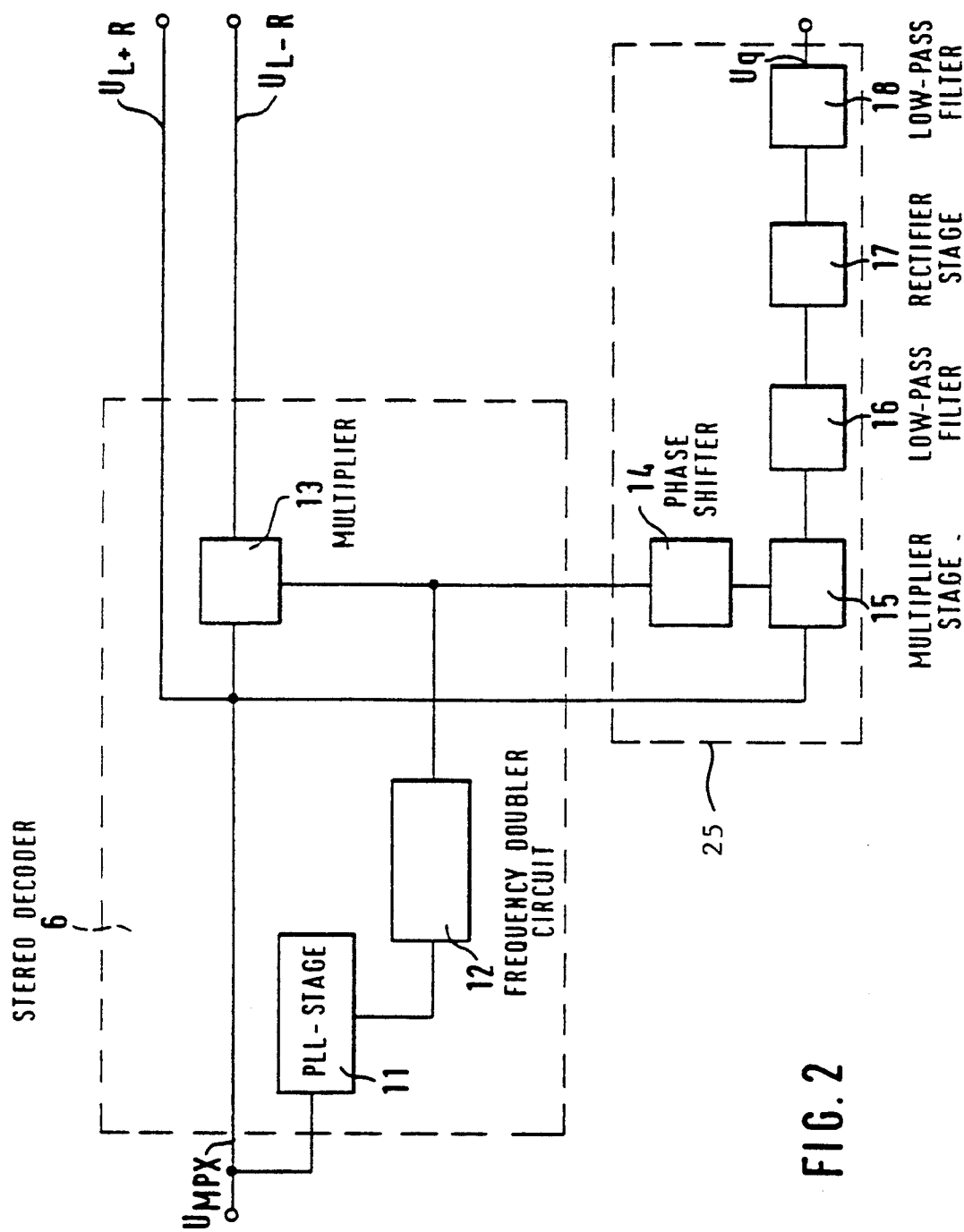

As FIG. 2 shows, the recognition circuit 25 is on the one hand supplied with the signal $U_{MPX}$; on the other, it is connected to the output of the frequency doubler circuit 12 and the stereo decoder. In the recognition circuit, the signal $U_{MPX}$ is multiplied in a multiplier stage 15 by the 38-kHz auxiliary carrier, once the latter has passed through a 90° phase shifter 14. The output signal of the multiplier stage 15 is filtered in a low-pass filter 16, the upper limit frequency of which is approximately 3 kHz. After that, the low-pass-filtered signal is rectified in a rectifier stage 17 and carried to a further low-pass filter 18.

The output signal of the low-pass filter 18 represents a measure 9 of the quality of the low frequency to be reproduced. The output signal is evaluated in a threshold value stage 19, and the possibly present output signal of the threshold value stage 19 initiates a new setting of the tuner to some other, alternative frequency of the selected program, or initiates a switch to some other program.

The following concept applies to the recognition circuit.

The signal $U_{MPX}$ of an FM station takes the form of $$U_{MPX} = U_{L+R} + U_p \sin W_p t + U_{L-R} \sin 2W_p t + U_{RDS},$$

in which
$U_{L+R}$ is the amplitude of the stereo summation signal
$W_p/2\pi$ is the frequency of the stereo pilot tone (19 kHz)
$U_p$ is the amplitude of the pilot tone
$U_{L-R}$ is the amplitude of the differential signal
$U_{RDS}$ is the amplitude of the 57-kHz auxiliary carrier with which the alternative carrier frequencies, among others, are transmitted.

In the case of multipath reception, but in the case of other interference situations as well, distortion occurs, leading to the following received signal:

$$U_{MPX(St)} = U_{MPX} + U_{St}$$
$$= U_{L+R} + \Delta U_{L-R} + (U_p + \Delta U_p)\sin(W_p t + \gamma) +$$
$$(U_{L-R} + \Delta U_{L-R})\sin 2W_p t + \Delta \hat{U}_{L-R}\cos 2W_p t +$$
$$U_{RDS} + \Delta U_{RDS}$$

$\gamma$ is the phase change in the pilot tone caused by the interference, and $\Delta \hat{U}_{L-R}$ is an interference component in the differential signal that is located in phase quadrature with respect to the suppressed carrier.

From this signal, the interfered-with differential signal $$U_{L-R}(St) = (U_{L-R} + \Delta U_{L-R})\cos 2\gamma - \Delta \hat{U}_{L-R}\sin 2\gamma$$
$$= U_{L-R} - [U_{L-R}(1 - \cos 2\gamma) - \Delta U_{L-R}\cos 2\gamma + \Delta \hat{U}_{L-R}\sin 2\gamma].$$

among others, is obtained in the stereo decoder.

The proportion of the MPX signal that is in phase quadrature with the suppressed carrier furnishes a signal $$U_q = (U_{L-R} + \Delta U_{L-R})\sin 2\gamma + \Delta \hat{U}_{L-R}\cos 2\gamma,$$

which is proportional to the interference.

Since the channel separation for higher frequencies is poorer even for good input signals, it is recommended that this signal be filtered with a low-pass filter (upper frequency limit of approximately 3 kHz), rectified and averaged over some time, to compensate for fluctuations in the differential signal.

Figure 3:
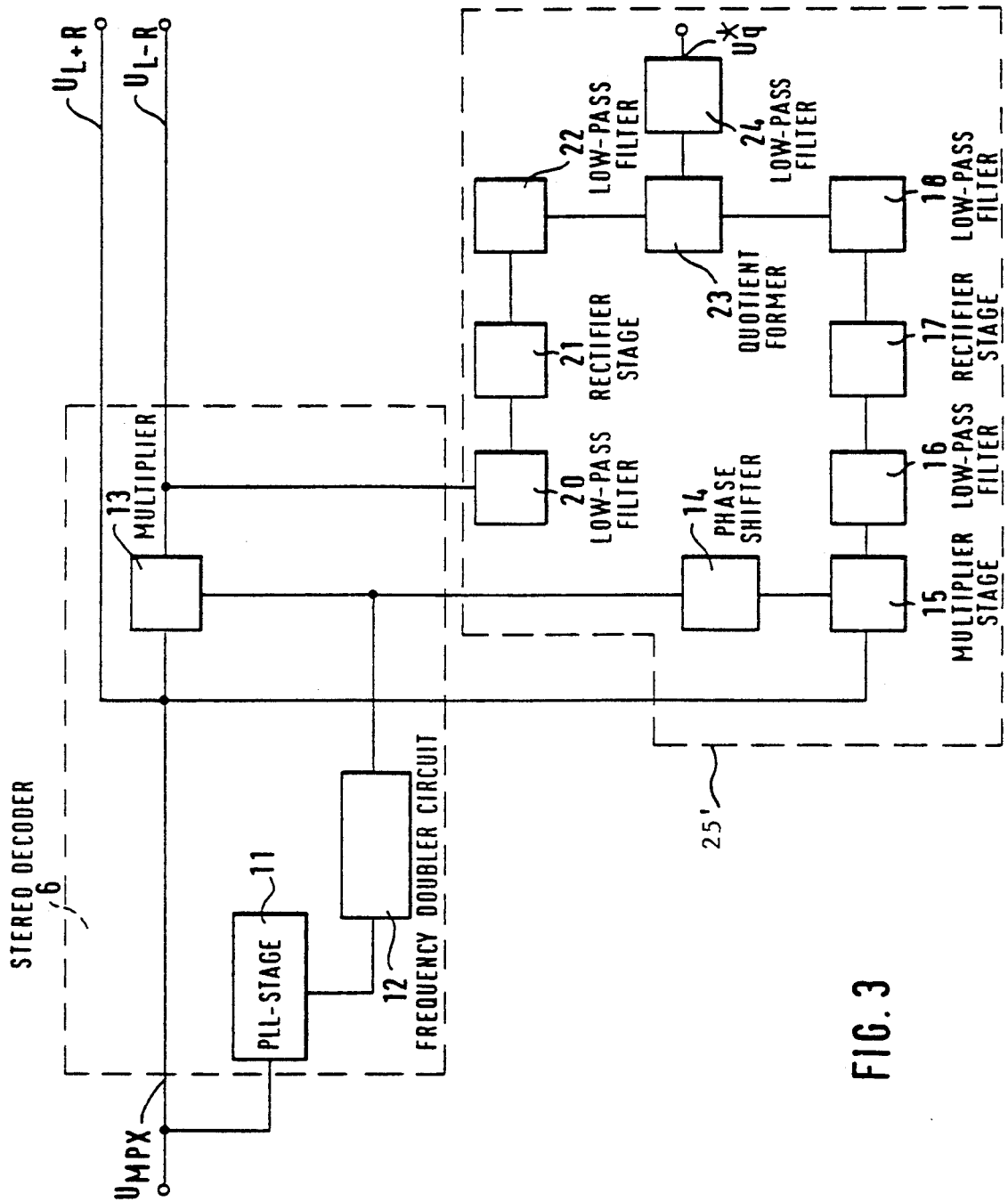

In a faster-response recognition circuit 25' which is shown in FIG. 3, the differential signal $U_{L-R}(St)$ is also carried via a low-pass filter 20, a rectifier stage 21 and a low-pass filter 22 and joined in a quotient former 23 with the output signal that can be taken from the circuit of FIG. 2. The output signal of the quotient former 23 is low-pass-filtered again, and if $U_q^*$ exceeds a predetermined threshold value, can initiate the new setting of the tuner via the threshold value stage 19.

Various changes and modifications may be made, and features described in connection with any one of the embodiments may be used with any of the others, within the scope of the inventive concept.

What is claimed is:

1. An FM car radio having
   FM demodulator means (5) whose output is a low-frequency multiplex signal;
   a stereo decoder (6) receiving, as its input, said multiplex signal and generating, as its outputs, a sum signal ($U_{L+R}$) and a difference signal ($U_{L-R}$); and
   an interference detector,
   wherein
   said interference detector includes means (14–18), responsive to said difference signal, for generating a signal component (Uq, Uq*) that is in phase quadrature with the difference signal and whose amplitude value indicates whether interference is present.

2. The FM car radio of claim 1,
   wherein, during operation of said interference detector,
   an output signal of a frequency doubler (12) and the stereo decoder (6), which is rotated in phase by 90° in a phase shifter (14), and the output signal of the FM demodulator (5) in the tuner (2) are multiplied with one another in a multiplier stage (15), and an output signal of said multiplier stage, after low-pass filtering (16) and rectification (17), serves as an interference indicator signal ($U_q$).

3. The FM car radio of claim 2,
   wherein, during operation of said interference detector,
   the difference signal, after low-pass filtration and rectification, is delivered along with the low-pass-filtered and rectified output signal of the multiplier (15) to a quotient former (23), and an output signal of said quotient former, after low-pass filtering (24), serves as an interference indicator signal (Uq*).

4. The FM car radio of claim 2, further comprising
   a threshold value stage (19), having an input connected to the output signal of said interference detector, and determining whether said interference indicator signal exceeds a predetermined threshold value which indicates that interference is present.

5. The FM car radio of claim 3, further comprising
   a threshold value stage (19), having an input connected to the output signal of said interference detector, and determining whether said interference indicator signal exceeds a predetermined threshold value which indicates that interference is present.

* * * * *